United States Patent
Zamer et al.

(10) Patent No.: US 10,043,206 B2
(45) Date of Patent: Aug. 7, 2018

(54) FACILITATING TRANSACTIONS IN CONNECTION WITH SERVICE PROVIDERS

(71) Applicant: PAYPAL, INC., San Jose, CA (US)

(72) Inventors: Kamal Zamer, San Jose, CA (US);
Lucy Ma Zhao, San Jose, CA (US);
Jayasree Mekala, San Jose, CA (US);
Satish V. Kumar, San Jose, CA (US);
Praveen Nuthulapati, San Jose, CA (US); Joseph Vernon Paulson, San Jose, CA (US); Krishna Sai Pendela Bala Venkata, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 91 days.

(21) Appl. No.: 13/963,954

(22) Filed: Aug. 9, 2013

(65) Prior Publication Data

US 2015/0046292 A1  Feb. 12, 2015

(51) Int. Cl.
*G06Q 30/00* (2012.01)
*G06Q 30/06* (2012.01)

(52) U.S. Cl.
CPC .............. *G06Q 30/0629* (2013.01)

(58) Field of Classification Search
CPC .......... G06Q 30/0601–30/0645; G06Q 30/08; G06Q 30/0224; G06Q 30/0629
USPC .......... 705/26.1–27.2, 14.25, 26.64
See application file for complete search history.

(56) References Cited

U.S. PATENT DOCUMENTS

| | | | | |
|---|---|---|---|---|
| 6,868,396 | B2 * | 3/2005 | Smith | G06F 17/3087 705/26.9 |
| 6,968,513 | B1 * | 11/2005 | Rinebold | G06Q 30/02 715/743 |
| 8,032,427 | B1 * | 10/2011 | Spreen et al. | 705/26.9 |
| 8,825,736 | B2 * | 9/2014 | Agrawal | 709/203 |
| 2009/0254971 | A1 * | 10/2009 | Herz | G06Q 10/10 726/1 |
| 2011/0106623 | A1 * | 5/2011 | Perkins | 705/14.58 |
| 2011/0106657 | A1 * | 5/2011 | Yu et al. | 705/26.9 |
| 2011/0137818 | A1 * | 6/2011 | Goad | G06Q 30/02 705/347 |
| 2011/0143711 | A1 * | 6/2011 | Hirson et al. | 455/410 |
| 2012/0197757 | A1 * | 8/2012 | Ajala | 705/26.9 |
| 2013/0138533 | A1 * | 5/2013 | Vartanian et al. | 705/26.35 |
| 2014/0149160 | A1 * | 5/2014 | Argue | G06Q 10/0631 705/7.13 |

* cited by examiner

*Primary Examiner* — Alexis M Casey
(74) *Attorney, Agent, or Firm* — Haynes & Boone, LLP

(57) ABSTRACT

A system according to an embodiment comprises one or more processors; and one or more memories adapted to store a plurality of machine-readable instructions which when executed by the processor(s) are adapted to cause the system to: receive, from a user device of a user, user input search information in connection with one or more desired items of interest to the user; determine one or more service providers or entities offering the one or more desired items based on a location of the user device; and generate comparative data for the one or more service providers or entities that provide the desired item(s) based on historical data of the one or more service providers or entities and the received user input search information.

20 Claims, 4 Drawing Sheets

(12)	US 10,043,206 B2

FACILITATING TRANSACTIONS IN CONNECTION WITH SERVICE PROVIDERS

BACKGROUND

Technical Field

Embodiments of the present disclosure generally relate to transactions, and more particularly, to methods and systems for facilitating transactions in connection with service providers.

Related Art

Routinely, an individual may seek services from service providers such as home improvement vendors, car repair or maintenance service providers, health care providers, etc. For example, an individual may seek health care provider services to meet specific health care needs such as dental cleaning services or other medical procedures. However, an individual may not have the benefit of comparative shopping for these types of services, for example, to compare rates or quality of different service providers. In the medical field, for example, even though different service providers may accept the same insurance plan, the experiences and quality of care may differ vastly from one health care provider to another, for instance, there may be vast differences in quality or price from one clinic to another clinic. Also, individuals may not have accurate cost estimates for a particular service. For example, in the medical field (or any other service related field), an individual may often receive a bill for services rendered that includes a "projected cost" for a particular service. In most cases, these "projected costs" may be inaccurate. The individual may be forced to make payments including manually writing successive checks, providing credit card information through the mail, or paying by telephone. This is a time-consuming process.

BRIEF DESCRIPTION OF THE FIGURES

Like element numbers in different figures represent the same or similar elements.

DETAILED DESCRIPTION

Figure 1:
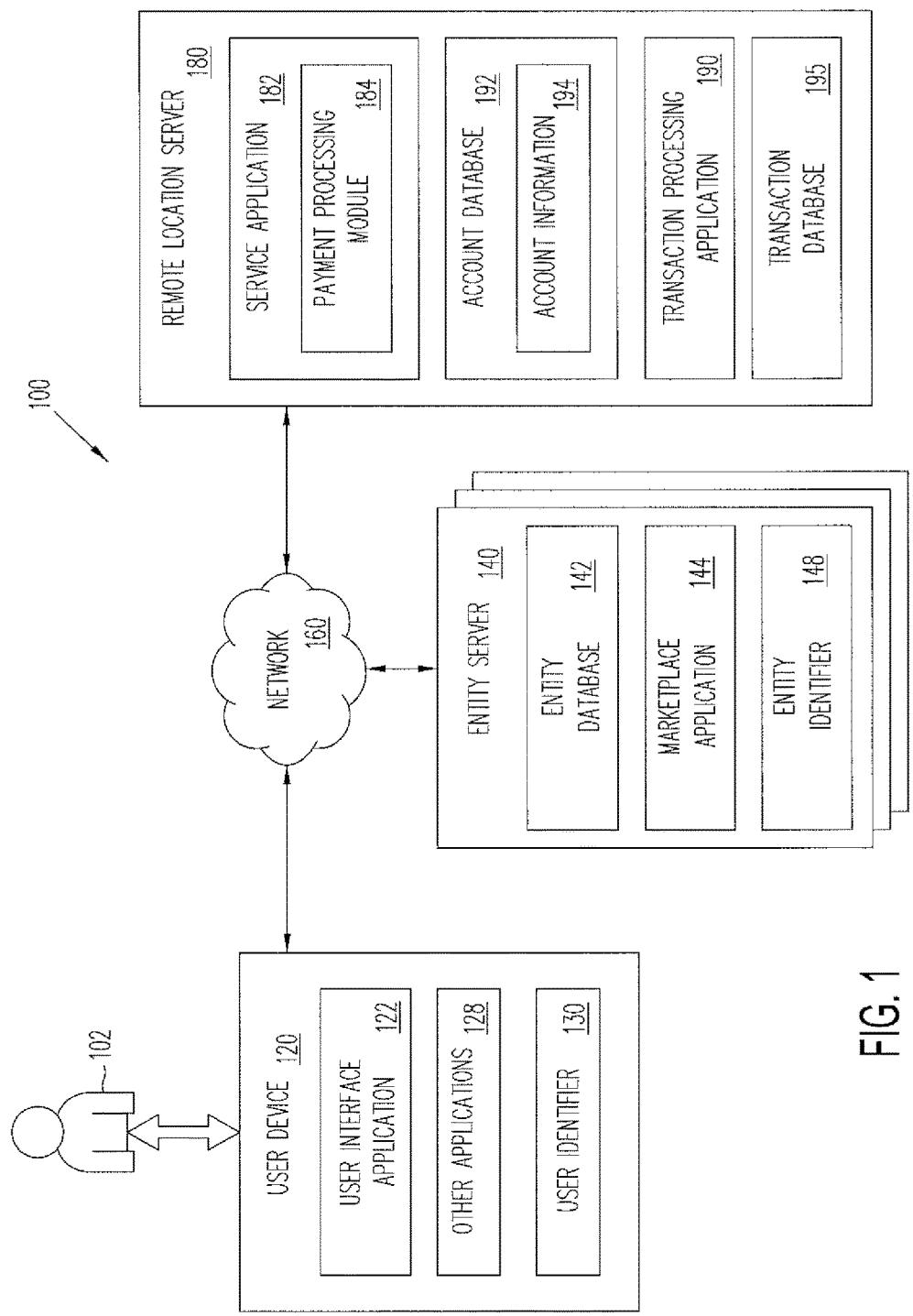
FIG. 1 is a block diagram of a system for facilitating transactions in connection with a service provider or entity according to an embodiment of the present disclosure.

In accordance with various embodiments described herein, methods and systems are provided for facilitating transactions in connection with service providers or entities. In various embodiments, a service provider application may be loaded on one or more user devices of a user by a server at a remote location maintained by an appropriate entity, for example, a payment service provider, a merchant, a financial institution or any other appropriate entity. In one embodiment, the application may be provided by a payment service provider such as PayPal® and/or eBay®, Inc. of San Jose, Calif., USA.

The service provider application may gather and record information about a user's experiences in connection with services offered by one or more service providers or entities such as health care providers, home improvement vendors, car maintenance or repair service providers, or the like. For example, the application may gather and record information about the user's experiences for specific types of health care needs such as dental cleanings including quality of cleanings, user ratings, etc. Also, the application may gather and record information about out-of-pocket expenses based on various factors such as the user's type of insurance coverage, or whether the user has any insurance coverage at all.

According to one or more embodiments, the application may provide a user, via a user device, accurate information about projected costs such as co-payment estimates for a particular service using historical data. The historical data may include information about other service providers or entities located nearby, information about the user, user ratings, purchase or shopping data, service history log of services performed, and/or estimated costs that may be gathered and stored over time. As such, the application may provide the user an opportunity to compare data related to each service provider or entity such as corresponding price, location, ratings, etc. so the user may make decisions ahead of time with respect to which service provider or entity to use. For example, the individual may compare data related to various health care providers and decide ahead of time which health care provider to use for a specific health care need such as a dental cleaning.

In another example, the application may present a user of a user device home improvement vendor comparison data (e.g. corresponding ratings). Nearby related services with availability and average cost may be presented. The costs between different vendors may be compared.

In various embodiments, the user may pre-authorize an average cost for a service. In further embodiments, the user may schedule a service via the application.

Currently, in service related fields such as in the medical field, home improvement field, or the like, a user may receive a "projected cost" for services. The "projected cost" may be inaccurate and the user may then be forced to manually write successive checks, provide credit card information through the mail or pay by telephone to satisfy the cost of rendered services.

According to one or more embodiments herein, the system may facilitate transactions such as processing intermediate payments to service providers on the user's behalf. A user may authorize the system to process transactions such as making payments to the service provider. Advantageously, the system may act as an intermediary and allow a user to conduct transactions such as making a payment once and not have to deal with further payments. This may alleviate the user having to deal with further payments that may result from inaccurate projected costs of a service. Also, the system may help users authorize payments based on historical data including various factors such as location, amount for services rendered, ratings, quality, etc. Furthermore, the service may gather and store the historical data over time based on learning actual payment amounts for specific services, location where the services are rendered, general insurance coverage, as well as other relevant factors. In that regard, the historical data may be based on data gathered over time based on the user's transaction data (e.g.

shopping history) or based on crowd-sourced data (e.g. other users' transaction or shopping history in similar situations or conditions).

Referring now to the drawings wherein the showings are for purposes of illustrating embodiments of the present disclosure only, and not for purposes of limiting the same, FIG. 1 illustrates a block diagram of a system for facilitating transactions in connection with a service provider or entity according to an embodiment of the present disclosure.

FIG. 1 shows an embodiment of a block diagram of a system 100 adapted to facilitate transactions in connection with a service provider or entity using a user device 120 over a network 160. As shown in FIG. 1, the system 100 includes at least one user device 120 (e.g., network computing device), one or more entity servers or devices 140 (e.g., network server devices), and at least one remote location server or device 180 (e.g., network server device) in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the user device 120, entity servers or devices 140, and remote location server or device 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 160. In various examples, the user device 120 may be implemented as a wireless telephone (e.g., cellular or mobile smart phone), a tablet, a personal digital assistant (FDA), a personal computer, a notebook computer, and/or various other generally known types of wired and/or wireless computing devices. It should be appreciated that the user device 120 may be referred to as a client device or a customer device without departing from the scope of the present disclosure.

The user device 120, in one embodiment, includes a user interface application 122, which may be utilized by a user 102 to conduct transactions (e.g., shopping, purchasing, bidding, etc.) with the entity server or device 140 or with the remote location server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the remote location server 180 via the network 160. In another implementation, the user interface application 122 comprises a browser module that provides a network interface to browse information available over the network 160. For example, the user interface application 122 may be implemented, in part, as a web browser to view information available over the network 160. In another example, the user 102 is able to access entity websites via the one or more entity servers 140 to view and select applications, products, and/or services ("items") for purchase, and the user 102 is able to purchase items from the one or more entity servers 140 via the remote location server 180. Accordingly, in one or more embodiments, the user 102 may conduct transactions (e.g., purchase and provide payment for one or more items) from the one or more entity servers 140 via the remote location server 180.

The user device 120, in various embodiments, may include other applications 128 as may be desired in one or more embodiments of the present disclosure to provide additional features available to user 102. In one example, such other applications 128 may include security applications for implementing client-side security features, programmatic client applications for interfacing with appropriate application programming interfaces (APIs) over the network 160, and/or various other types of generally known programs and/or software applications. In still other examples, the other applications 128 may interface with the user interface application 122 for improved efficiency and convenience.

According to one or more embodiments, the user interface application 122 or the other applications 128 may include a service provider application that may be loaded on user device 120 by remote location server 180 or other appropriate entity. The service provider application enables a user device (which may be user device 120 or a separate user device such as a personal computer also having the downloaded application) to gather and record information about the user's 102 experiences for specific types of items such as services provided by an entity associated with entity server 140. The service provider application may provide user 102 with an ability to compare data (e.g., prices, quality of services, ratings, location, etc.) about various entities and make decisions ahead of time about which entities to use to meet the user's needs. In one or more embodiments, user 102 may complete a transaction such as making payments to the appropriate entity via remote location server 180, wherein remote location server 180 may be, for example, a payment service provider. In further embodiments, intermediate payments may be made to the appropriate entity via remote location server 180 on behalf of user 102. In that regard, user 102 may pre-authorize remote location server 180 to hold funds for making payments to entities on behalf of user 102. As such, remote location server 180 may make automatic payments on behalf of user 102.

The user device 120, in one embodiment, may include at least one user identifier 130, which may be implemented, for example, as operating system registry entries, cookies associated with the user interface application 122, identifiers associated with hardware of the user device 120, or various other appropriate identifiers. The user identifier 130 may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 130 may be passed with a user login request to the remote location server 180 via the network 160, and the user identifier 130 may be used by the remote location server 180 to associate the user 102 with a particular user account maintained by the remote location server 180.

The one or more entity servers 140, in various embodiments, may be maintained by one or more business entities (or in some cases, by a partner of a business entity that processes transactions on behalf of business entities). Examples of businesses entities include health care provider sites, home improvement vendors, vehicle repair or maintenance service providers, merchant sites, resource information sites, utility sites, real estate management sites, social networking sites, etc., which offer various items for purchase and payment. In some embodiments, business entities may need registration of the user identity information as part of offering the items to the user 102 over the network 160. As such, each of the one or more entity servers 140 may include an entity database 142 for identifying available items, which may be made available to the user device 120 for viewing and purchase by the user 102. It should be appreciated that although a user-entity transaction is illustrated in this embodiment, the system may also be applicable to user-user, entity-entity and/or entity-user transactions.

Each of the entity servers 140, in one embodiment, may include a marketplace application 144, which may be configured to provide information over the network 160 to the user interface application 122 of the user device 120. For example, the user 102 may interact with the marketplace application 144 through the user interface application 122 over the network 160 to search and view various items available for purchase in the entity database 142.

Each of the entity servers 140, in one embodiment, may include at least one entity identifier 148, which may be associated or be included as part of the one or more items made available for purchase so that, e.g., particular items are associated with particular entities. In one implementation, the entity identifier 148 may include one or more attributes and/or parameters related to the entity, such as business and banking information. In various embodiments, user 102 may conduct transactions (e.g., searching, selection, monitoring, purchasing, and/or providing payment for items) with each entity server 140 via the remote location server 180 over the network 160.

The remote location server 180, in one embodiment, may be maintained by a transaction processing entity, which may provide processing for financial transactions and/or information transactions between the user 102 and one or more of the entity servers 140. As such, the remote location server 180 includes a service application 182, which may be adapted to interact with each user device 120 and/or each entity server 140 over the network 160 to facilitate the searching, selection, purchase, and/or payment of items by the user 102 from one or more of the entity servers 140. In one example, the remote location server 180 may be provided by PayPal®, Inc., eBay® of San Jose, Calif., USA, and/or one or more financial institutions or a respective intermediary that may provide multiple point of sale devices at various locations to facilitate transaction routings between entities and, for example, financial institutions.

The service application 182, in one embodiment, utilizes a payment processing module 184 to process purchases and/or payments for financial transactions between the user 102 and each of the entity servers 140. In one implementation, the payment processing module 184 assists with resolving financial transactions through validation, delivery, and settlement. As such, the service application 182 in conjunction with the payment processing module 184 settles indebtedness between the user 102 and each of the entities 140, wherein accounts may be directly and/or automatically debited and/or credited of monetary funds in a manner as accepted by the banking industry.

The remote location server 180, in one embodiment, may be configured to maintain one or more user accounts and entity accounts in an account database 192, each of which may include account information 194 associated with one or more individual users (e.g., user 102) and entities (e.g., one or more entities associated with entity servers 140). For example, account information 194 may include private financial information of each user 102 and each entity associated with the one or more entity servers 140, such as one or more account numbers, passwords, credit card information, banking information, or other types of financial information, which may be used to facilitate financial transactions between the user 102 and the one or more entities associated with the entity servers 140. In various aspects, the methods and systems described herein may be modified to accommodate users and/or entities that may or may not be associated with at least one existing user account and/or entity account, respectively.

In one implementation, the user 102 may have identity attributes stored with the remote location server 180, and the user 102 may have credentials to authenticate or verify identity with the remote location server 180. User attributes may include personal information, banking information and/or funding sources as previously described. In various aspects, the user attributes may be passed to the remote location server 180 as part of a login, search, selection, purchase, and/or payment request, and the user attributes may be utilized by the remote location server 180 to associate the user 102 with one or more particular user accounts maintained by the remote location server 180.

A transaction processing application 190, which may be part of payment processing module 184 or separate, may be configured to receive information from one or more user devices such as user device 120 and/or one or more entity servers such as entity server 140 for processing and storage in a transaction database 195. Transaction processing application 190 may include one or more applications to process information from users such as user 102 for processing an order and payment through one or more entities as described herein. As such, transaction processing application 190 may store details of an order associated with transactions between one or more entities and a user. Payment processing module 184 may be further configured to determine the existence of and to manage accounts for user 102, as well as create new accounts if necessary.

Transaction database 195 may store transaction information from completed transactions, including authorization details and/or details of the transactions. Details of a transaction may include a description of services rendered, total costs, locations, dates, forms of payment, co-payment amounts (if any), etc. Such information may also be stored in a third party database accessible by the remote location server provider and/or the entity server.

The system 100 described above with respect to the embodiment of FIG. 1 may be used for gathering and recording information about users' experiences and costs in connection with transactions with a service provider or entity. Such information may be recorded or stored in a database, for example, transaction database 195 of remote location server 180 and/or, in some embodiments, in entity database 142 of entity server 140. In an example, a service provider application downloaded and installed on a user device may gather and store information about a user's experiences for specific types of healthcare needs, for example, dental cleanings. Information about the user's experiences may include, for example, information on how the user liked the services, the quality of the services, cleanliness of a facility, customer service, etc. The application may also gather and store information about costs, co-payments, or out-of-pocket expenses based on various factors such as the type of insurance coverage, lack of insurance, etc. As such, the application may gather and record information in connection with transactions with one or more service providers or entities such that the application may provide the user a much better way to compare data based on the user's experiences and costs, and allow the users to make decisions about where to go for services ahead of time. Furthermore, the application may provide the user with an option to pre-authorize a remote location server to hold funds in an amount based on historical data in order pay to entities on the user's behalf, e.g., to make automatic intermediate payments on the user's behalf. Advantageously, the user may avoid having to make subsequent or intermediate payments that may be due to inaccurate projected costs.

Figure 2:
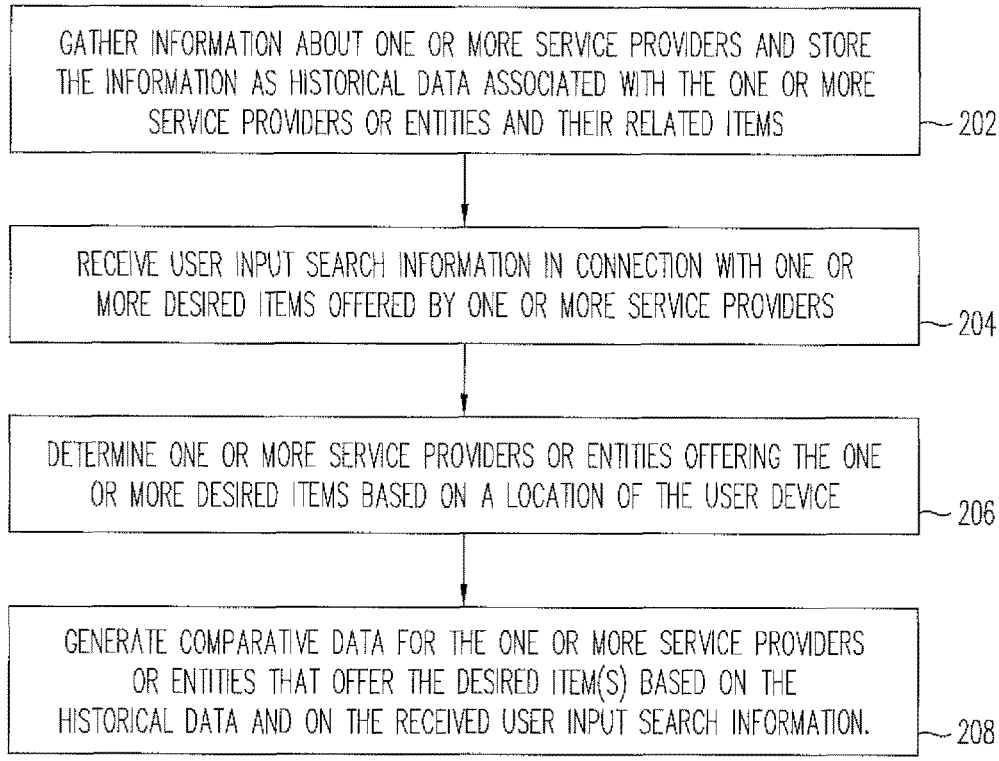
FIG. 2 is a flow diagram illustrating a method for providing service provider comparative data according to an embodiment of the present disclosure.

Referring now to FIG. 2, a flow diagram illustrates a method for providing service provider comparative data according to an embodiment of the present disclosure. It should be appreciated that the method illustrated in the embodiment of FIG. 2 may be implemented by the system illustrated in FIG. 1 according to one or more embodiments.

As described above according to the embodiment of FIG. 1, an application may be provided by a remote location server such as remote location server 180 that may be installed, downloaded and ran on one or more user devices such as user device 120. The application may be installed on any one or more user devices associated with a user such as a mobile device, e.g., a personal computer, a tablet, a smart phone, etc. as described above according to one or more embodiments.

In block 202, the application may gather information about one or more service providers or entities and store the information as historical data associated with the one or more service providers or entities and their related items. For example, the application may gather and record information about a user's experiences for specific types of services such as healthcare needs including dental cleanings, annual medical exams, etc. In addition, the application may gather information regarding costs for the specific services, for example, out-of-pocket expenses associated with a particular health insurance, or out-of-pocket expenses when the user has no health insurance.

The information gathered about the one or more service providers or entities may be stored as historical data, for example, in account database 192 or transaction database 195 of remote location server 180 illustrated in the embodiment of FIG. 1. The historical data may include particular service provider information such as user ratings or reviews, actual costs for items offered by the particular service provider, location of the service provider, or any other appropriate information.

In block 204, user input search information may be received from a user device of a user in connection with one or more desired items (e.g., a specific type of service of interest to the user) offered by one or more service providers. For example, a user may search for dental cleaning services using the user device having the downloaded application. It should be understood that the user may specify many different search criteria including, for example, the type of desired services, location of the service providers (e.g., within 5, 10, 20 miles, etc.), only service providers having above a certain user rating (e.g. above 3.5 stars, etc.), service providers that take a specific type of insurance, service providers within the user's health care network or out of network, etc.

In block 206, the system or application may determine one or more service providers or entities offering one or more desired items of interest to the user based on a location of the user device. For example, the service provider application may generate or display a view such as a list or a map view of service providers that offer the desired item(s) in a particular area based on the user device's GPS location. In one instance, when a user searches for dental services, the service provider application may generate a map view of a dental provider area based on the user device's GPS location. In various embodiments, the user may search for service providers that offer certain desired item(s) and that meet certain criteria such as type of insurance accepted, a particular type of dental work, etc. In this instance, the application may show dental service providers based on location that accept the user's insurance and offer the particular type of dental work the user desires.

In block 208, the application may generate comparative data for the one or more service providers or entities that offer the desired item(s) based on the historical data and on the received user input search information. The comparative data may be presented or displayed on the user's user device. In an example, comparative data for the service providers may include a list or a view such as a map view identifying service providers or entities that provide dental cleaning services located within a certain area along with information on service provider experiences such as quality of care, efficiency, timeliness, cleanliness, customer service, other user's ratings, time to see the dentist after the appointment time or office wait time, etc. for each service provider, as well as costs or out-of-pocket expenses for dental cleanings using insurance A, insurance B, or costs when the user has no insurance. It should be understood that comparative data for service providers may be presented or displayed on a user device in many different ways as appropriate for viewing by a user, e.g. a list, a link, a map, a pop-up window, an image, etc.

In a general example, it may be difficult for a user to do comparative shopping involving health care providers (or other service providers). Even when health care providers accept the same insurance plan, the experiences of users such as quality of care may differ vastly from one health care provider to another. Advantageously, according to one or more embodiments herein, the system may provide a user with a very efficient way to compare data associated with service providers so the user may make decisions about where to go to acquire services (e.g. where to go get a dental cleaning) ahead of time based on factors that may be important to the user such as quality, wait times, or costs.

Figure 3:
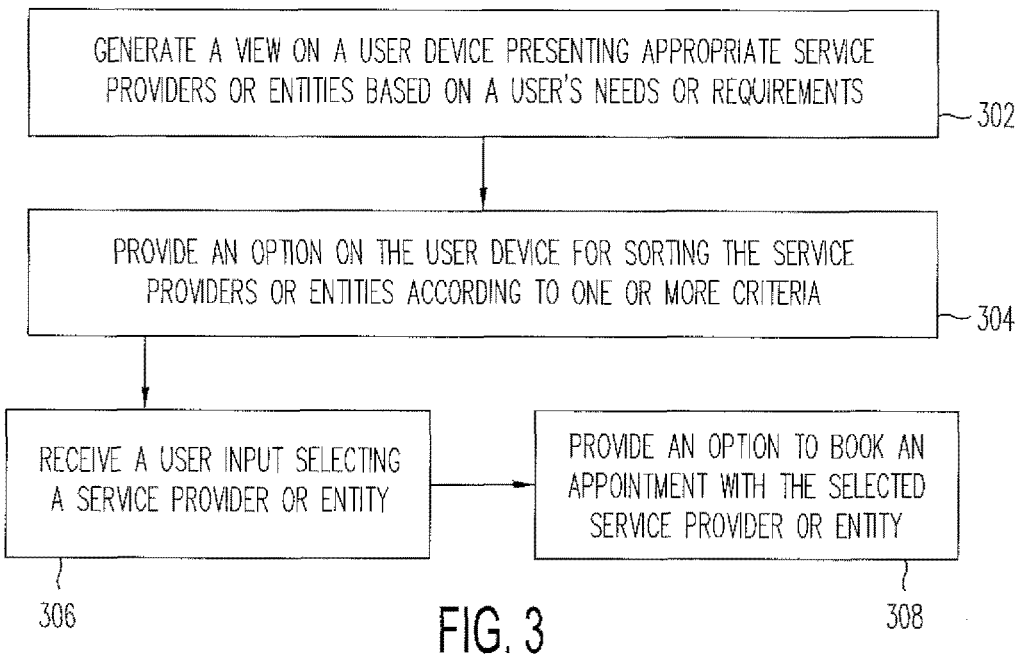
FIG. 3 is a flow diagram illustrating a method of presenting service provider or entity options according to an embodiment of the present disclosure.

Referring now to FIG. 3, a flow diagram illustrates a method of presenting service provider or entity options according to an embodiment of the present disclosure. The method illustrated in the embodiment of FIG. 3 may include different options presented to a user with respect to a service provider after providing service provider comparative data as described above with respect to the method illustrated in FIG. 2 according to one or more embodiments.

In block 302, a view may be generated on a user device identifying appropriate service providers or entities based on a user's needs or requirements. In various embodiments, the generated view (along with comparative data) may be produced as described above with respect to the embodiment of FIG. 2.

In one embodiment, a list may be presented on a user device listing the different service providers or entities that satisfy a user's search request, for example, the names, locations, telephone numbers, websites, social media information, etc. along with user ratings, costs for particular services, insurance accepted, etc. for each of the different service providers. In another embodiment, a map view may be generated identifying the different service providers or entities that satisfy a user's search request. For example, all the service providers in a particular region or area (e.g., within 10 miles) that offer a particular service may be pinpointed on a map view. For each pinpointed service provider, comparative data such as linked information may provide details about the service provider such as user ratings, type of insurance accepted, location, etc.

In block 304, an option may be provided on the user device for sorting the service providers or entities according to one or more criteria. For example, the user may sort the service providers by location showing the closest service providers at the top, by user ratings showing the highest-rated service providers at the top, by type of insurance accepted, by costs showing the least expensive service providers at the top, etc. Lists may be ordered based on what the user values most, such as determined by user set preferences, inferred from user payments or transactions, or from social network information.

In block 306, a user input (via the user device) may be received selecting a service provider or entity. Based on the comparative data presented on the user device, the user may select a service provider or entity that best meets the user's needs.

In block 308, once the user has selected a service provider or entity, the application may provide an option on the user device to book an appointment with the selected service provider or entity.

It should be appreciated that embodiments of the present disclosure may apply to many varied situations as in the examples presented below. It should be noted that the examples below are for illustrative purposes only and are not meant to be limiting of the scope of the present disclosure.

Example 1—Presenting Data for User to Make Decisions about Health Care Providers According to an embodiment, a service provider application may be downloaded on a user device such that service provider data may be presented for a user to use in making decisions about service providers. In this example, users may make decisions about health care providers based on various factors including, for example, the user having insurance coverage that is accepted by a health care provider.

In one instance, the user is enrolled with an insurance provider plan A through the user's place of employment or company. The user wants to obtain some dental work. The user opens the service provider application that is downloaded on his or her user device, selects the insurance provider tab, and chooses insurance provider plan A. Then, the user inputs the type of dental work desired, for example, a dental cleaning.

The service provider application generates a view such as a map view of a dental provider area based on the user device's GPS location showing dental service providers that accept the user's insurance and offer the particular type of dental work the user desires.

In an embodiment, the application may present an option to sort the service provider results first by patient review, then by final out of pocket expenses, for example. Lastly, the application may present an option for the user to book an appointment via the application on the user device once the user has selected a service provider.

Although the example above involves health care providers, it should be understood that embodiments of the present application may relate to many different service providers other than health care provider s, including, for example, home improvement service providers, car repair or maintenance service providers, consulting services, contractors, etc.

Example 2: Presenting Data for User to Make Decisions about Other Types of Service Providers A user wants to use a home improvement service provider or contractor to get a bathroom remodel. The user gets a written estimate from a contractor. The user would like to know if the written estimate is fair as well as information about the quality of the contractor.

In this example, using the service provider application, the user may capture the written estimate provided by the contractor into his or her user device, for example, the user may take a picture or scan the written estimate provided by the contractor. As such, the application acquires information regarding the user's estimate for a service to remodel a bathroom.

Based on historical data, including for example crowd-sourced data, the application may compare the estimate the user has against other users who have had similar services performed, for example, in the same area or location of the user. In various instances, the application may look for data related to users who had similar bathroom sizes, style of work performed, finishes chosen, etc. from the contractor's estimate.

The application may also look for other users or customers who had homes similar to the user's home, located in similar types of neighborhoods, having similar builds of homes, etc. so the estimate price may be compared against the closest type of house. For example, if the user has a condominium, the application may look for other customers who had similar work done in the same condominium complex or in similar types of condominiums.

Based on the historical data, the application may find the closest, highest-rated contractor that may perform the work, and present the information to the user on the user device.

Furthermore, the application may show the closest, highest-rated contractors who are also available or have an "open work schedule" on their personal calendars with which the user may use to schedule an appointment.

Figure 4:
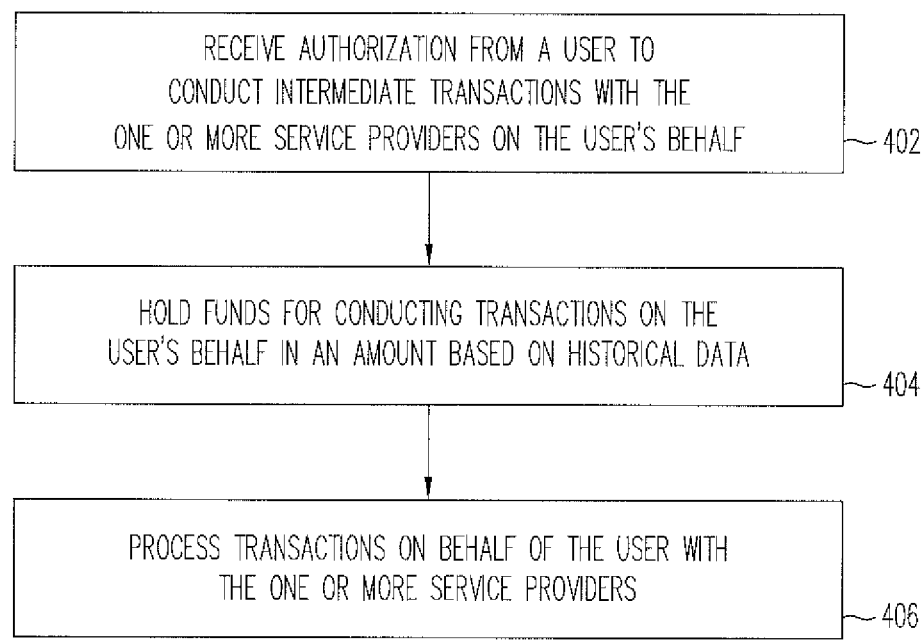
FIG. 4 is a flow chart illustrating a method for conducting transactions associated with a service provider according to an embodiment of the present disclosure.

Referring now to FIG. 4, a flow chart illustrates a method for conducting transactions associated with a service provider according to an embodiment of the present disclosure. The method illustrated in FIG. 4 according to an embodiment may be performed subsequent to the methods illustrated in the embodiments of FIGS. 2 and 3 after a user has selected and received desired services from a service provider.

In various embodiments related to service related fields such as the medical field, home improvement field, car maintenance or repair field, etc., once a user has received services from a service provider, the user may often receive a bill for services rendered, which includes a "projected cost". In most cases, the "projected costs" may be inaccurate. As a result, the user may be forced to make subsequent payments such as manually provide successive checks, or provide credit card information through the mail or pay by telephone. This may be a time-consuming process. Embodiments of the present disclosure may provide a system that may conduct intermediate transactions related to a service provider, for example, the system may make intermediate payments on the user's behalf. In an embodiment, the user may authorize a remote location server (such as remote location server 180 illustrated in the embodiment of FIG. 1) to hold funds to pay to service providers on the user's behalf.

In block 402 of FIG. 4, the system may receive authorization from a user to conduct intermediate transactions with the one or more service providers on behalf of the user. In an example where a user receives dental cleaning services, the user may receive an "estimate" for services rendered. Because the "estimate" may not be accurate, the user may pre-authorize a remote location server to make intermediate payments to cover any costs for discrepancies between the "estimate" and actual costs.

In block 404, the user may authorize the system to hold funds for conducting transactions on the user's behalf in an amount based on historical data. In one or more embodiments, the system may use historical data from similar cost items and service providers to estimate costs of a particular item. An automatic payment may be made on behalf of the user to use the held funds to cover the costs for an item.

In various embodiments, the actual cost or charges for a particular item may be automatically compared with historical data reflecting usual past costs or charges for the particular item to determine any discrepancy in the costs or charges. In case a discrepancy between the actual charges and the usual past charges is encountered, the user may be alerted or notified of the discrepancy on the user device, and given an opportunity to dispute the charges or to confirm a payment for the charge, for example.

In block 406, the system may process transactions on behalf of the user with the one or more service providers. For example, the system may complete transactions or make payments to a service provider for services rendered on behalf of the user.

Embodiments of the present disclosure may apply to many other varied examples as presented below. It should be noted that the examples below are for illustrative purposes only and are not meant to be limiting of the scope of the present disclosure.

Example 3—Selecting a Service Provider and Making Payments on the User's Behalf

Once a user selects a service provider to visit in connection with a desired item, the user may conduct transactions with the service provider (e.g., make payments for services rendered) via a service provider application downloaded from a remote location server such as a payment service provider. For example, when the user visits a dentist for a regular dental checkup, the user may decide to pay for the visit to the dentist via the service provider application on his or her user device.

The application may access the user's historical data such as shopping or purchase history. For example, the application may determine, based on the user's purchase history, how, over time, the user generally pays for dental visits. In that regard, the application may determine that the user generally ends up paying a different amount for dental visits than an amount indicated in an originally-itemized bill. For example, the user may usually make a payment of $50 for the dental visit on the dental appointment day. Subsequently, within about 3 months, the user may make another payment of $20 for the same dental visit bringing the total dentist visit costs to $70 (compared to the originally-itemized bill stating $50). As such, in this example, a "two step billing" situation occurs that may be inefficient.

According to one or more embodiments herein, the user may authorize a remote location server, via the service provider application, to hold funds, for example, a "maximum amount" needed to pay for the services rendered by a service provider.

Through payment APIs that may be offered by a service provider such as a dental office at a Point-of-Sale (POS), the service provider application may determine the costs of each item, for example, each dental service, as well as the services the user has had and how much insurance is projected to pay for each item.

The application may determine that in a worst case, the user may have to pay for everything without the help of an insurance company, even if the user does have insurance. As such, the remote location server, via the application, may "hold" the maximum amount needed to pay a bill for the user's visit to the service provider.

The remote location server may then pay the service provider for the user's outstanding portion of the bill after the service provider reconciles payments for example, with an insurance provider. Any remaining funds may be deposited back into the user's account with the remote location server and the "hold" may be then be released.

Over time, the application may determine how much the user generally pays for service provider items such as a generic dentist visit (e.g., a regular cleaning). Instead of "holding" the maximum amount possible for the bill, the application may hold what it has determined should be the actual bill the user will have to pay. This way, the user only has to authorize a payment once for a service provider bill.

In various embodiments, the application may also compare prices for items that similar users are getting at the same service provider and use that data to better project the actual cost for service provider items. Similar users may include users having the same insurance provider, are of the same age, have about the same health needs (e.g. same dental health), etc. As such, the user may prepay via the remote location server up to the highest projected amount and have his or her money held and paid on his or her behalf by the remote locations server.

In various embodiments, when a user enters into a location, the application may recognize the location as a place of business, based on, for example, map APIs, harvesting transaction data by location, etc. The place of business may be recognized and the actual service provider may be recognized, for example, a dentist office location.

In embodiments involving insurance companies, the insurance companies may have APIs that the application may log into on the user's behalf and determine the costs of various items, for example, the cost of general dental treatments.

In various embodiments, the treatment that a user is getting may be determined by analyzing the user's personal calendar entries. For example, the user's personal calendar may show an appointment as "Dentist appointment regular checkup". Based on this entry, the application may access the insurance API to determine how much the user's service may cost. The user's historical data or purchase history for that service provider (if it exists) may be used as an indication for how much the service is likely to cost.

Example 4—Selecting a Service Provider and Making Payments where Users have the Same Insurance Benefits Employees at a company may have the same group benefits such as one dental plan that offers similar benefits to all company employees. When employees go to in-network providers and receive generic treatments (e.g., regular dental cleanings, filling cavities, etc.), the costs for the generic treatments are the same for all the employees.

In this example, employee A is part of the company's dental plan. Employee A selects, schedules, and attends a regular dental checkup with an in-network dentist office. After the checkup is complete, employee A authorizes a payment for the services by a remote location server (e.g. PayPal®) on his user account. Employee A may authorize the payment through his or her service provider application when he or she interacts with the service provider POS. Employee A may also authorize a payment by having the service application recognize the "vendor in his current location." For instance, employee A may have a GUI that shows all the vendors in his current location (in this example, the dentist office). Employee A may choose the "dentist office" from the service provider application GUI and authorize a payment for $XXX for this vendor.

The application may look at historical data such as past payments made for the insurance plan, the type of treatment or procedure, and the in-network service provider. Then, the application may determine and hold the maximum dollar amount from Employee A's account balance at the remote location server. When the service provider or vendor bills Employee A, the remote location server may automatically pay the bill.

In instances where the billed amount is more than the general average amount (for example, within a 10-15% threshold), Employee A may be alerted or notified so that Employee A may be able to authorize the payment via the service provider application.

In various embodiments, time may be used to determine the type of items needed. The service provider application may analyze the previous services obtained by a user, for example, a regular checkup at the dentist versus a regular checkup plus fluoride every six months. The user's personal Calendar appointment entries may be analyzed to determine if the user is going to the dentist every six months, if so, then a visit may be determined to be a regular treatment. Based on historical data such as purchase data, service history log of services performed, etc., the application may project which treatments are due for the user at the next appointment. The application may estimate and access payment information for each service that is due to be performed. This way, the user may understand what services might be due.

Example 5—Selecting a Car Repair or Maintenance Service Provider, Estimating Costs and Making Payments A user that enjoys keeping his or her car in top shape usually schedules maintenance for his or her vehicle. The user may use a remote location server such as a payment provider, e.g., Paypal®, to pay for car maintenance or repairs.

The remote location server may have access to the user's historical data such as purchasing history for services performed for the user's vehicle. The user may be able to input vehicle specifications such as the user's car make, model, year, mileage, etc. into a service provider application downloaded from the remote location server. When the user schedules maintenance for his or her car, the application may determine what repairs the user has made to his car, and what services or repairs are due, based at least in part on what the user has purchased or has recently done.

The user may specify an auto service location such as a dealership that the user plans on visiting for his or her car appointment. The application may access historical data such as payment data of the dealership as well as a "statement of services" to determine the costs for each particular service.

The remote location server, via the application, may also mine data of other application users who have similar vehicles, have had similar services performed, and/or also went to the dealership for service.

The user may create an entry on his or her calendar with an appropriate tag or line such as "Regular car checkup". Because of the calendar entry, the application may determine that the user is only looking at regular or normal maintenance. Using the user's vehicle specifications, the application may diagnose what services are recommended to be performed on the vehicle, for example, an oil change, air filter, etc. The user may then determine how much the service will cost.

When the user goes to pay for the maintenance service at the dealership using the service provider application from the remote location server, the remote location server may authorize a hold for funds for the services that the user actually had performed, and compare them against the services that the application had expected or inferred were needed. The application may then learn if its projections were accurate in predicting the user's needs and/or bills. In an instance where the service provider team found extra repairs were needed, the application may use this information as data points in projecting bills for other application users in the future. Over time, the application may determine the "expected needed services" and the "possible extra services" a car checkup may entail.

In an instance where the user has a car warranty, the remote location server may hold the maximum amount of funds needed to pay for a service bill while the dealership reconciles payment with the warranty company. The remote location server may process a transaction such as completing payment for the user's portion of the bill, if any.

Advantageously, as illustrated in the examples described above, the remote location server, via a service provider application, may act as an intermediary and allow a user to conduct a transaction such as to make a payment only once and not have to deal with further payments. In addition, the remote location server, via the service provider application, may help users authorize payments based on location or other relevant data. Also, the remote location server may learn actual payment amounts of services over time.

Figure 5:
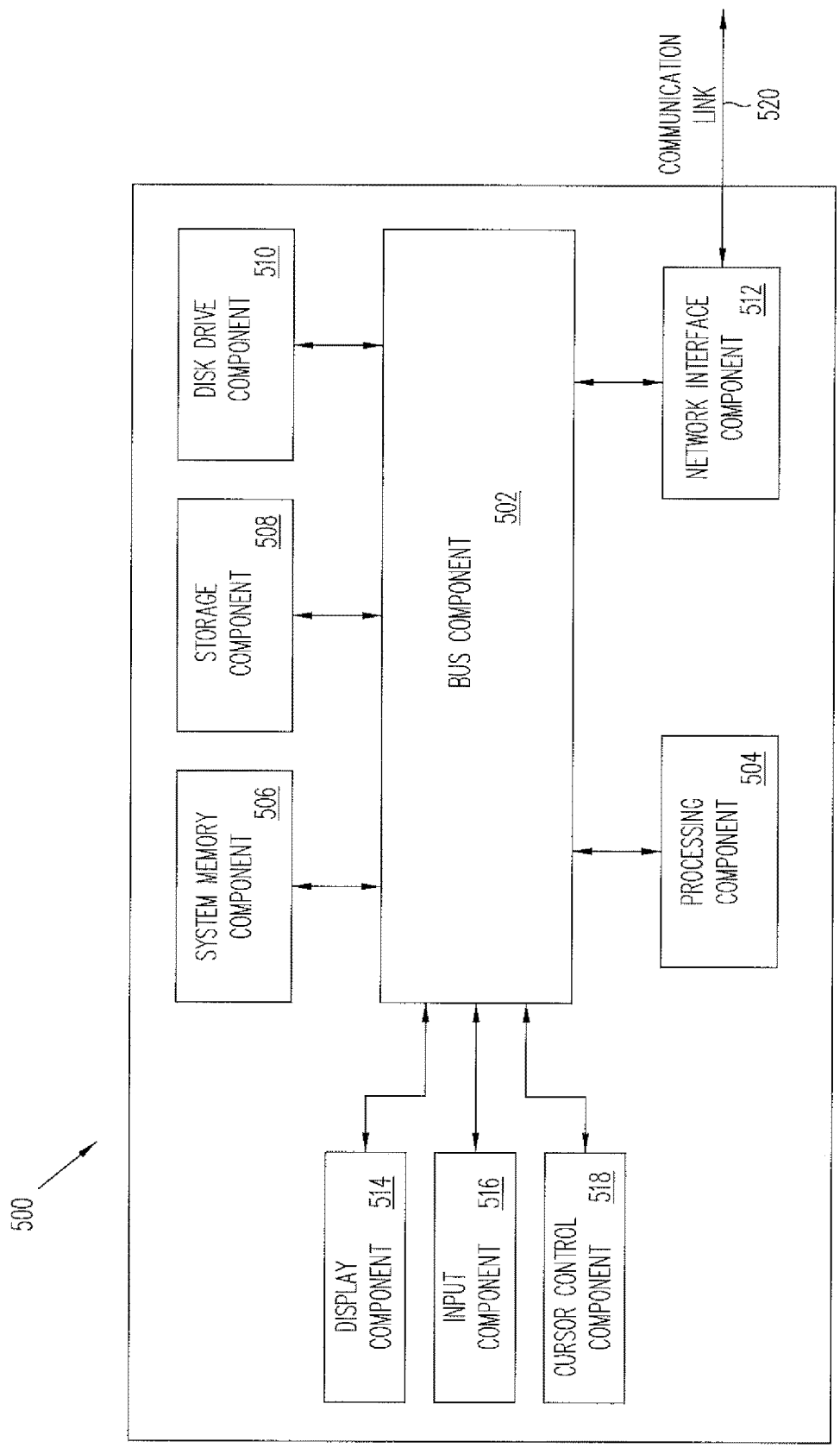
FIG. 5 is a block diagram of a system for implementing a device according to one embodiment of the present disclosure.

Referring now to FIG. 5, a block diagram of a system 500 is illustrated suitable for implementing embodiments of the present disclosure, including user device 120, one or more entity servers or devices 140, and remote location server or device 180. System 500, such as part of a cell phone, a smart phone, a tablet, a personal computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad, keyboard, touchpad, voice input, etc.), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to present comparative data for service providers of desired items based on historical data, process financial transactions, make payments, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching, auto-synchronizing, making payments or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., network 160 of FIG. 1, LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

In view of the present disclosure, it will be appreciated that various methods and systems have been described according to one or more embodiments for facilitating transactions in connection with service providers. Comparative data for service providers may be presented based on historical data such that a user may select a service provider, authorize intermediate transactions on the user's behalf and hold funds for conducting transactions on the user's behalf in an amount based on the historical data.

Although various components and steps have been described herein as being associated with user device 120, entity server 140, and remote location server 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure. For example, although merchant transactions have been described according to one or more embodiments, it should be understood that the present disclosure may also apply to transactions where requests for information, requests for access, or requests to perform certain other transactions may be involved.

Having thus described embodiments of the disclosure, persons of ordinary skill in the art will recognize that changes may be made in form and detail without departing from the scope of the disclosure. Thus the disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   in response to receiving an user input search information in connection with an item of interest of the user, determining, with data from an entity database, a service provider offering the item for an advertised cost;
   accessing, from a transaction database, historical data associated with a historical transaction of the item;
   determining, from analyzing the historical data, a projected cost of the item;
   determining a projected cost discrepancy for the items based on the projected cost and the advertised cost;
   transmitting the projected cost discrepancy to a user interface application of an user device to cause a graphical user interface to display the projected cost discrepancy;
   processing, in response to an actual cost discrepancy, an intermediate transaction, using funds from an user account maintained by an account database, to cover the actual cost discrepancy; and
   updating the historical data of the transaction database in response to the actual cost discrepancy.

2. The system of claim 1, wherein the operations further comprise:
   receiving, by the transaction database, information about the service provider, wherein the information comprises quality of care, efficiency, timeliness, cleanliness, customer service, other users' ratings, or wait times of the service provider; and
   storing, by the transaction database, the information as the historical data.

3. The system of claim 1, wherein the service provider is determined based on a global positioning system (GPS) location of the user device, and wherein the operations further comprise:
   accessing, from the transaction database, a geo-position of the service provider; and
   transmitting, to the user device, information that generates a view of the service provider, wherein the view comprises a list or a map view of an area including the service provider that provides the item based on the GPS location of the user device.

4. The system of claim 1, wherein the historical data further comprises crowd sourced data, nearby service providers, information about the user, purchase or shopping history, user ratings, or estimated costs.

5. The system of claim 1, wherein the operations further comprise:
   determining, with the data from the entity database, a plurality of service providers offering the item; and
   providing an option on the user device for sorting the plurality of service providers according to a user criteria, wherein the user criteria comprises a location of the service provider(s), other user reviews, final out of pocket expenses, or costs.

6. The system of claim 1, wherein the determining the service provider is further based on interaction with a map Application Programming Interface (API), and wherein the determining the projected cost is performed through payment application programming interfaces (APIs) offered by the service provider.

7. The system of claim 1, wherein the operations further comprise:
   holding, at the user account in response to receiving authorization to conduct a transaction for the item and prior to the processing the intermediate transaction, an amount of funds based on the projected cost discrepancy.

8. The system of claim 1, wherein the intermediate transactions comprise an intermediate payment automatically made from the user account to the service provider.

9. The system of claim 1, wherein the historical data is based on similar cost items and service providers.

10. The system of claim 1, wherein the operations further comprise:
    determining a maximum amount needed to pay for the items to an account of the service provider; and
    holding, at the user account, the maximum amount.

11. A method comprising:
    in response to receiving an user input search information in connection with an item of interest of the user, determining, with data from an entity database, a service provider offering the item for an advertised costs;
    accessing, from a transaction database, historical data associated with a historical transaction of the item;
    determining, from analyzing the historical data, a projected cost of the item;
    determining a projected cost discrepancy for the items based on the projected cost and the advertised cost;
    transmitting the projected cost discrepancy to a user interface application of an user device to cause a graphical user interface to display the projected cost discrepancy;
    processing, in response to an actual cost discrepancy, an intermediate transaction, using funds from an user account maintained by an account database, to cover the actual cost discrepancy; and
    updating the historical data of the transaction database in response to the actual cost discrepancy.

12. The method of claim 11, further comprising:
    receiving, by the transaction database, information about the service provider, wherein the information comprises quality of care, efficiency, timeliness, cleanliness, customer service, other users' ratings, or wait times of the service provider
    storing, by the transaction database, the information as the historical data.

13. The method of claim 11, wherein the service provider is determined based on a global positioning system (GPS) location of the user device, and further comprising:
    accessing, from the transaction database, a geo-position of the service provider; and
    transmitting, to the user device, information that generates a view of the service provider, wherein the view comprises a list or a map view of an area including the service provider that provides the item based on the GPS location of the user device.

14. The method of claim 11, wherein the historical data further comprises crowd sourced data, nearby service providers, information about the user, purchase or shopping history, user ratings, or estimated costs.

15. The method of claim 11, further comprising:
    determining, with the data from the entity database, a plurality of service providers offering the item; and
    providing an option on the user device for sorting the plurality of service providers according to a user criteria, wherein the user criteria comprises a location of the service provider(s), other user reviews, final out of pocket expenses, or costs.

16. The method of claim 11, wherein the determining the service provider is further based on interaction with a map Application Programming Interface (API), and wherein the determining the projected cost is performed through payment application programming interfaces (APIs) offered by the service provider.

17. The method of claim 11, further comprising:
    holding, at the user account in response to receiving authorization to conduct a transaction for the item and prior to the processing the intermediate transaction, an amount of funds based on the projected cost discrepancy.

18. The method of claim 11, wherein the intermediate transactions comprise an intermediate payment automatically made from the user account to the service provider.

19. The method of claim 11, further comprising:
    determining a maximum amount needed to pay for the items to an account of the service provider; and
    holding, at the user account, the maximum amount.

20. A non-transitory computer readable medium having stored thereon machine-readable instructions executable to cause a machine to perform operations comprising:
    in response to receiving an user input search information in connection with an item of interest of the user, determining, with data from an entity database, a service provider offering the item for an advertised costs;
    accessing, from a transaction database, historical data associated with a historical transaction of the item;
    determining, from analyzing the historical data, a projected cost of the item;
    determining a projected cost discrepancy for the items based on the projected cost and the advertised cost;

transmitting the projected cost discrepancy to a user interface application of a user device to cause a graphical user interface to display the projected cost discrepancy;

processing, in response to an actual cost discrepancy, an intermediate transaction, using funds from an user account maintained by an account database, to cover the actual cost discrepancy; and updating the historical data of the transaction database in response to the actual cost discrepancy.

* * * * *

UNITED STATES PATENT AND TRADEMARK OFFICE
CERTIFICATE OF CORRECTION

PATENT NO. : 10,043,206 B2
APPLICATION NO. : 13/963954
DATED : August 7, 2018
INVENTOR(S) : Kamal Zamer et al.

It is certified that error appears in the above-identified patent and that said Letters Patent is hereby corrected as shown below:

In the Specification

In the Detailed Description:

In Column 3, Line 39, change "(FDA)" to --(PDA)--.

In the Claims

In Claim 8, Column 17, Line 39, change "transactions" to --transaction--.

In Claim 10, Column 17, Line 46, change "items" to --item--.

In Claim 11, Column 17, Line 53, change "costs" to --cost--.

In Claim 18, Column 18, Line 48, change "transactions" to --transaction--.

In Claim 19, Column 18, Line 52, change "items" to --item--.

In Claim 20, Column 18, Line 61, change "costs" to --cost--.

Signed and Sealed this
Second Day of October, 2018

Andrei Iancu
*Director of the United States Patent and Trademark Office*